United States Patent
Yamazaki et al.

(10) Patent No.: US 7,026,781 B2
(45) Date of Patent: Apr. 11, 2006

(54) STEPPING MOTOR DRIVING SYSTEM, INFORMATION RECORDING AND REPRODUCING DEVICE, AND STEPPING MOTOR DRIVING METHOD

(75) Inventors: Hitoshi Yamazaki, Saitama (JP); Takeshi Nishimura, Saitama (JP); Akira Yasaki, Saitama (JP); Hideki Kinoshita, Saitama (JP); Shigeru Kojima, Saitama (JP); Jun Togashi, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 11/087,721

(22) Filed: Mar. 24, 2005

(65) Prior Publication Data

US 2005/0218857 A1    Oct. 6, 2005

(30) Foreign Application Priority Data

Mar. 24, 2004  (JP)  ............................ P2004-087212

(51) Int. Cl.
*G05B 19/40* (2006.01)
(52) U.S. Cl. ...................... 318/685; 318/696; 318/611; 318/623
(58) Field of Classification Search ................ 318/611, 318/623, 621, 685, 696
See application file for complete search history.

(56) References Cited

U.S. PATENT DOCUMENTS

| | | | | |
|---|---|---|---|---|
| 4,369,398 A | * | 1/1983 | Lowry, Sr. .................. | 318/114 |
| 5,180,958 A | * | 1/1993 | Choshitani et al. ......... | 318/623 |
| 5,612,598 A | * | 3/1997 | Fukui et al. ................. | 318/116 |
| 6,222,336 B1 | * | 4/2001 | McKenzie et al. .......... | 318/448 |

FOREIGN PATENT DOCUMENTS

JP    2003-58192 A    2/2003

* cited by examiner

*Primary Examiner*—Rina Duda
(74) *Attorney, Agent, or Firm*—Sughrue Mion, PLLC

(57) ABSTRACT

A stepping motor driving system includes: a stepping motor that rotates at a predetermined angle according to a driving pulse signal, a vibration detector that detects vibration to output a vibration signal, and a stepping motor control unit that controls the driving pulse signal, which is applied to the stepping motor, to rotate the stepping motor at the predetermined angle. The driving pulse signal includes a start-up current which is required for rotating the stepping motor at a unit angle and a holding current which maintains a rotational angle of the stepping motor rotated by the start-up current. The stepping motor control unit changes the level of the holding current according to the vibration signal which is outputted from the vibration detector.

5 Claims, 4 Drawing Sheets

US 7,026,781 B2

STEPPING MOTOR DRIVING SYSTEM, INFORMATION RECORDING AND REPRODUCING DEVICE, AND STEPPING MOTOR DRIVING METHOD

The present disclosure relates to the subject matter contained in Japanese Patent Application No. 2004-087212 filed Mar. 24, 2004, which is incorporated herein by reference in its entirety.

BACKGROUND OF THE INVENTION

1. Field of the Invention

The present invention relates to a stepping motor driving system, an information recording and reproducing apparatus, and a stepping motor driving method.

2. Background Art

In recent years, an optical disk recording and reproducing apparatus for reproducing an optical disk such as a compact disk (CD) or a digital versatile disk (DVD) is widely used as one of information recording and reproducing apparatuses in various fields. The optical disk recording and reproducing apparatus is configured such that various information are read from the optical disk and are recorded into the optical disk by irradiating laser light onto the optical disk and by receiving reflected light from the optical disk while the optical disk mounted on and fixed to a turntable is rotated.

Irradiation of laser light onto the optical disk is performed by an optical pickup device. The optical pickup device mainly has a laser light source and a lens that collects laser light outputted from the laser light source to irradiate laser light onto the optical disk. These elements are mounted within a carriage that is configured to slide in a diameter direction of the optical disk. The carriage mainly performs two operations of a trace operation for releasing a shift of the lens which is generated at the time of a track following operation and a search operation in which the carriage moves up to a target address in the optical disk.

The carriage is generally driven with a direct current (DC) motor. The DC motor is generally configured to transfer power to a feed screw via a deceleration gear. If the feed screw rotates by rotational force of the DC motor, the carriage slides in the diameter direction of the optical disk according to the rotation of the feed screw (for example, JP-A-2003-58192 (FIG. 1)).

Further, an optical disk recording and reproducing apparatus which uses a stepping motor as a motor for driving the carriage has been proposed. The stepping motor is generally configured to control a rotational angle according to the number of pulses which are applied to the stepping motor. Accordingly, the rotation amount of the feed screw and the positional control of the carriage can be performed with high precision.

SUMMARY OF THE INVENTION

Generally, the DC motor transfers power to the feed screw by a gear train including the deceleration gear, and thus a frictional torque generated by the gear train such as the deceleration gear or the like serves as a buffer with respect to external force, such as vibration or the like, which is applied to the carriage or the feed screw. Thus, the position of the carriage can be held without requiring a large holding torque within the motor.

However, the stepping motor is directly coupled with the feed screw via a joint without passing the gear or the like, and thus the external force applied to the feed screw or the carriage is transferred into the stepping motor as it is. Accordingly, in order to maintain the position of the carriage, it is necessary to make a holding current flow in the stepping motor to an extent such that a holding torque is maintained within the motor, even when the stepping motor does not rotate.

In the optical disk recording and reproducing apparatus, the control time of the apparatus is mostly reserved for the trace operation. In the trace operation, the time for which the stepping motor is held is overwhelmingly longer than the time for which the stepping motor rotates. Thus, it naturally takes long time for the holding current to be applied to hold the stepping motor. Therefore, in the case of the stepping motor, the power consumption or the heating value of the motor increases by the application of the holding current, as compared to the case in which the DC motor is used.

It is an object of the invention to reduce power consumption or a heating value of a motor even when a holding current is applied.

According to a first aspect of the invention, there is provided a stepping motor driving system including a stepping motor that rotates at a predetermined angle according to a driving pulse signal, a vibration detector that detects vibration to output a vibration signal, a stepping motor control unit that controls the driving pulse signal flowing in the stepping motor to rotate the stepping motor at the predetermined angle. The driving pulse signal includes a start-up current which is required for rotating the stepping motor at a unit angle and a holding current which maintains a rotational angle of the stepping motor rotated by the start-up current. Further, the stepping motor control unit changes the level of the holding current according to the vibration signal which is outputted from the vibration detector.

Further, according to a second aspect of the invention, there is provided a stepping motor driving method including detecting vibration to generate a vibration signal, and controlling a driving pulse signal, which is applied to a stepping motor, to rotate the stepping motor at a predetermined angle. The driving pulse signal includes a start-up current which is required for rotating the stepping motor at a unit angle and a holding current which maintains a rotational angle of the stepping motor rotated by the start-up current. Further, the level of the holding current is changed according to the generated vibration signal.

BRIEF DESCRIPTION OF THE DRAWINGS

The present invention may be more readily described with reference to the accompanying drawings.

DETAILED DESCRIPTION OF THE PREFERRED EMBODIMENTS

Hereinafter, an embodiment of an information recording and reproducing apparatus according to the invention will be described with reference to the drawings. In the following description, an optical disk recording and reproducing apparatus, in particular, a vehicle optical disk recording and reproducing apparatus is exemplified as an example of the information recording and reproducing apparatus.

Figure 1:
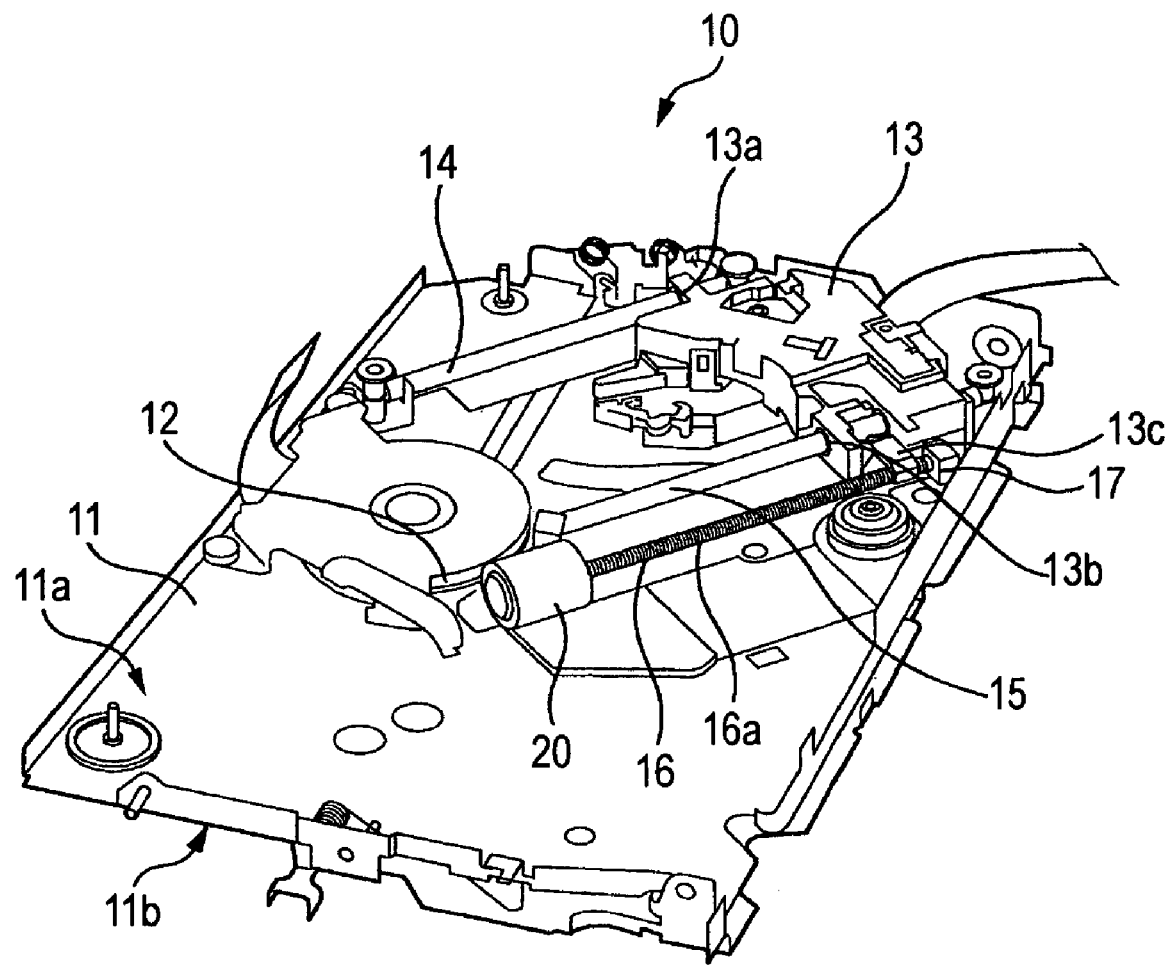
FIG. 1 is a partial-perspective view showing essential parts of a reading and reproducing mechanism of an optical disk recording and reproducing apparatus according to the present invention.
Figure 2:
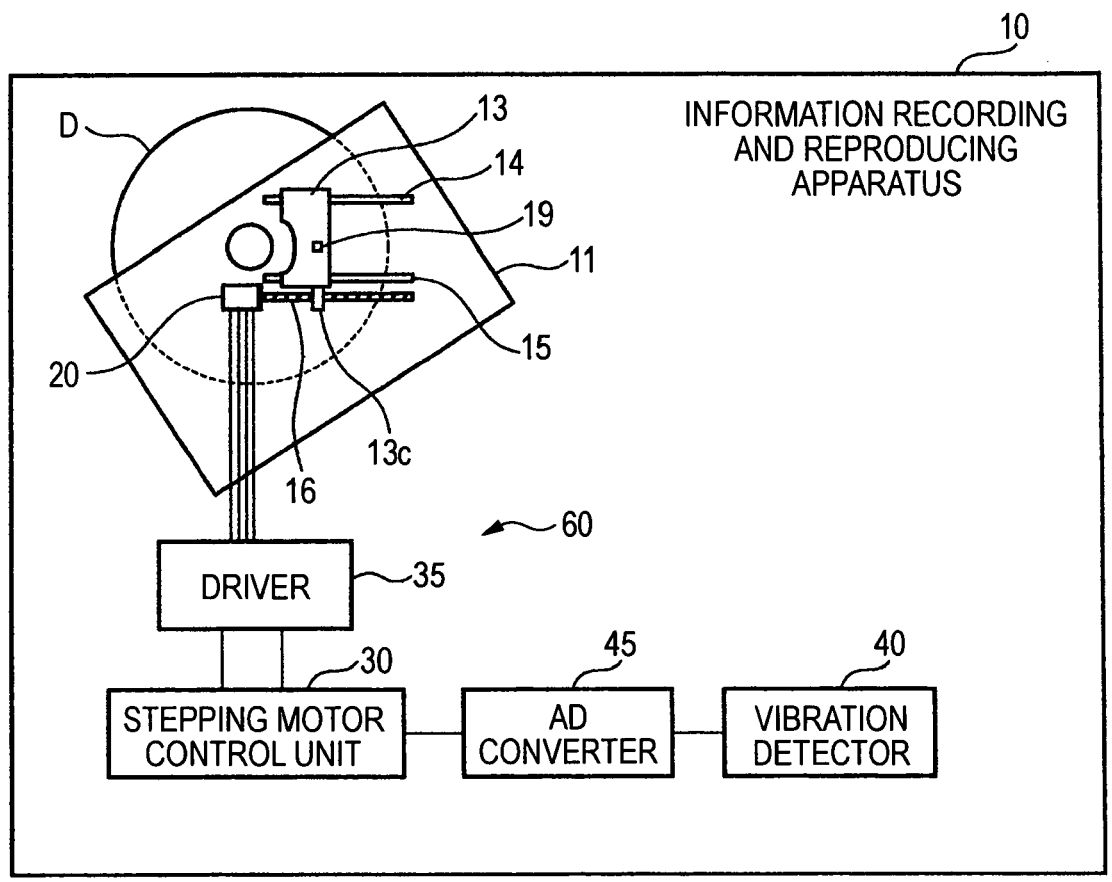
FIG. 2 is a block diagram showing essential parts of a control structure of the optical disk recording and reproducing apparatus according to the present invention.

FIG. 1 is a partial perspective view showing essential parts of a reading and reproducing mechanism of an optical disk recording and reproducing apparatus of the present embodiment. FIG. 2 is a block diagram showing essential parts of a control structure of the optical disk recording and reproducing apparatus of the present embodiment.

The optical disk recording and reproducing apparatus 10 of the present embodiment is configured such that various functional components are provided on a chassis 11 serving as a frame.

The chassis 11 is generally a rectangular base substrate in a top view, which is formed by molding a metal plate with a punch press process or the like, for example.

A spindle motor 12 for rotating an optical disk D is mounted on a back surface 11b of the chassis 11. A turntable (not shown) is mounted on a rotational shaft of the spindle motor 12 and the optical disk D rotates while being loaded on the turntable.

Further, a carriage 13 is provided on a front surface of the chassis 11. The carriage 13 is provided with an optical pickup device therein. Laser light outputted from a laser light source (not shown) is irradiated from an objective lens 19 (see FIG. 2) provided at a central portion of the carriage 13 toward an information recording surface of the optical disk D. The optical disk recording and reproducing apparatus 10 reads information from the optical disk D or writes information into the optical disk D by laser light.

In the carriage 13, guide shafts 14 and 15 are inserted into-two supporting holes 13a and 13b which are provided near both end portions, respectively. Both ends of the guide shafts 14 and 15 are fixed to the chassis 11 such that the guide shafts 14 and 15 are approximately parallel to each other. The guide shafts 14 and 15 serve as guides that regulate movement directions of the carriage 13. The carriage 13 is mounted to slide only in longitudinal directions of the guide shafts 14 and 15.

A feed screw 16 is provided near the guide shaft 15 to be approximately parallel to the guide shaft 15. In the feed screw 16, a spiral thread groove 16a is formed and an engaging piece 13c integrally with the carriage 13 is engaged with the thread groove 16a. One end of the feed screw 16 is supported by a bearing 17 such that the feed screw 16 can be rotated. Other end of the feed screw 16 is directly coupled with an output shaft of a stepping motor 20.

The stepping motor 20 is a motor which rotates at a predetermined angle according to a driving pulse signal supplied thereto. The feed screw 16 rotates according to the rotation amount of the stepping motor 20. If the feed screw 16 rotates, the engaging piece 13c of the carriage 13 slides while being guided through the thread groove 16a and moves the objective lens 19 in a direction parallel to the guide shafts 14 and 15, specifically, in the diameter direction of the optical disk D, together with the entire portion of the carriage 13. As such, the stepping motor 20 is configured to move the carriage 13, that is, the objective lens 19 relatively with respect to the optical disk D according to the rotation amount of an output shaft thereof and to irradiate laser light from the objective lens 19 over the entire region in a radius direction of the optical disk D.

Next, a driving circuit which drives the stepping motor 20 will be described with reference to FIG. 2.

In a case of a two-phase type, the stepping motor 20 can be driven in a mode of one-phase excitation, two-phase excitation, 1-2-phase excitation, or the like which controls a rotational angle according to the number of driving pulses supplied thereto and a micro-step mode which minutely controls the rotational angle of the stepping motor 20 by minutely dividing an excitation pulse to be supplied. In the following description, the operation of the stepping motor 20 in the micro-step mode will be described with laying emphasis on the trace operation at the time of the track following operation in which the stepping motor 20 needs to be controlled at a minute angle.

As a control mechanism which controls the stepping motor 20, a stepping motor control unit 30, a driver 35, a vibration detector 40, and an AD converter 45 are provided. These elements configure a stepping motor driving system 60, together with the stepping motor 20.

The stepping motor control unit 30 is a driving waveform generating circuit which generates a driving waveform for driving the stepping motor 20.

Figure 3:
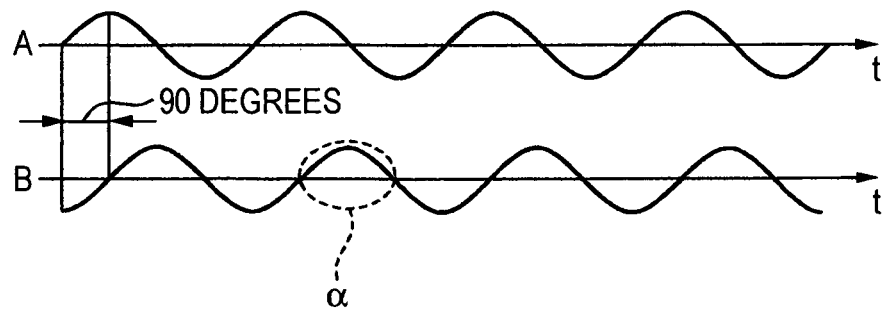
FIG. 3 is a graph showing an example of a driving waveform generated by a stepping motor control unit.
Figure 4A:
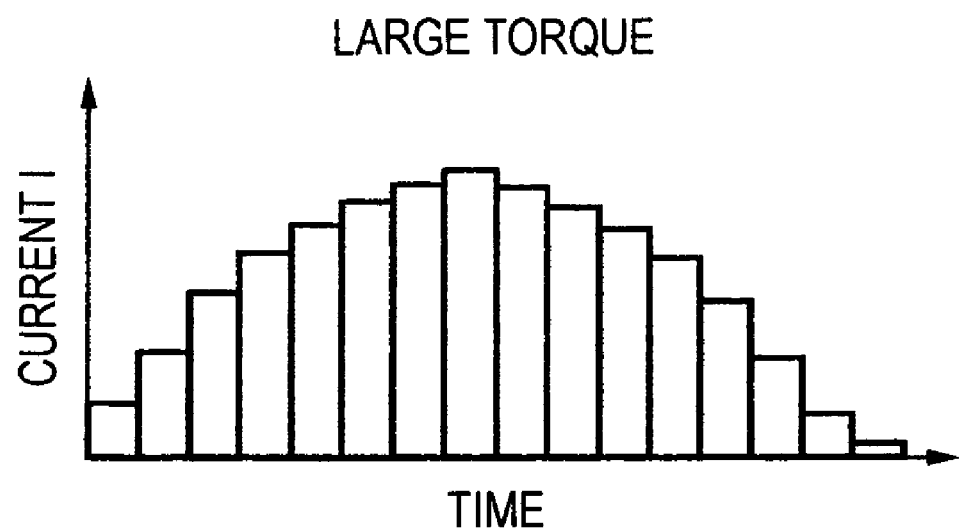
FIG. 4A is an expanded view of a region a of FIG. 3 in a case of a waveform having a large torque.
Figure 4B:
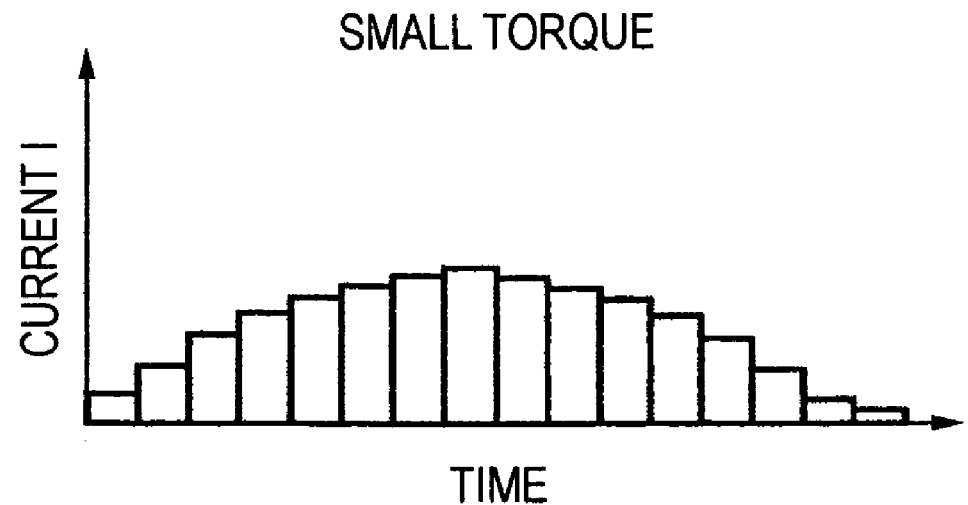
FIG. 4B is an expanded view of the region a of FIG. 3 in a case of a waveform having a small torque.

FIG. 3 is a graph showing an example of the driving waveform generated by the stepping motor control unit 30. FIGS. 4A and 4B are expanded views of a region a of FIG. 3.

In the micro-step mode, as the driving waveform generated by the stepping motor control unit 30, as shown in FIG. 3, a two-phase sine wave of a sine wave A and a sine wave B which deviates by 90° C. from the sine wave A is exemplified. The stepping motor control unit 30 controls forward rotation and reverse rotation of the stepping motor 20 by advancing the phase of one of the sine wave A and the sine wave B earlier than that of the other, that is, by selecting a phase-advanced sine wave. For example, the stepping motor control unit 30 rotates the stepping motor 20 in the forward direction when the sine wave A is advanced by 90 degrees from the sine wave B and rotates the stepping motor 20 in the reverse direction when the sine wave B is advanced by 90 degrees from the sine wave A.

The driver 35 amplifies the two sine waves A and B generated by the stepping motor control unit 30 and generates two sine waves C and D which have reverse phases against the two sine waves A and B. Then, the four sine waves A to D generated and amplified by the driver 35 are respectively supplied to the stepping motor 20. The rotational angle of the stepping motor 20 is controlled by the phases of the respective sine waves A to D.

Here, as shown in FIGS. 4A and 4B, the stepping motor control unit 30 combines various kinds of square waves to generate one crest of a sine wave. In the example shown in FIG. 4A or 4B, one crest of the sine wave is divided into 16 square waves and the stepping motor 20 rotates at a unit angle by the respective divided square waves. For example, in a case of a motor which is a two-phase type and has five equivalent poles, the stepping motor 20 is configured to rotate by 36 degrees by all 16 square waves. In the stepping motor 20, if the current value I of a longitudinal axis of FIG. 4A or 4B changes, the size of interaction with a magnet in the stepping not or 20 changes. Specifically, as shown in FIG. 4A, when the sine wave of whose average current value I of all square waves is large is inputted to the stepping motor 20, a rotational shaft torque and a holding torque of the stepping motor 20 becomes large. On the other hand, as shown in FIG. 4B, when the sine wave whose average current value I of all square waves is relatively small is inputted to the stepping motor 20, the holding torque of the stepping motor 20 becomes small.

The vibration detector 40 is a sensor which detects vibration applied to the optical disk recording and reproducing apparatus 10. As the vibration detector 40, various acceleration sensors, displacement sensors, or the like may be used. However, the structure thereof is not particularly limited. The vibration detector 40 converts the size of the vibration into an electric signal and outputs the electric signal to the AD converter 45. Then, the AD converter 45 converts the electric signal outputted from the vibration detector 40 into a digital signal and output the converted digital signal to the stepping motor control unit 30. Here, a noise filter may be arranged between the stepping motor control unit 30 and the AD converter 45 such that the electrical signal is outputted to the stepping motor control unit 30 after the waveform thereof is shaped.

In the present embodiment, the stepping motor control unit 30 is configured to variably control the current level of the sine wave outputted therefrom according to the level of the vibration applied to the optical disk recording and reproducing apparatus 10 and to change the size of the holding torque of the stepping motor 20.

Figure 5:
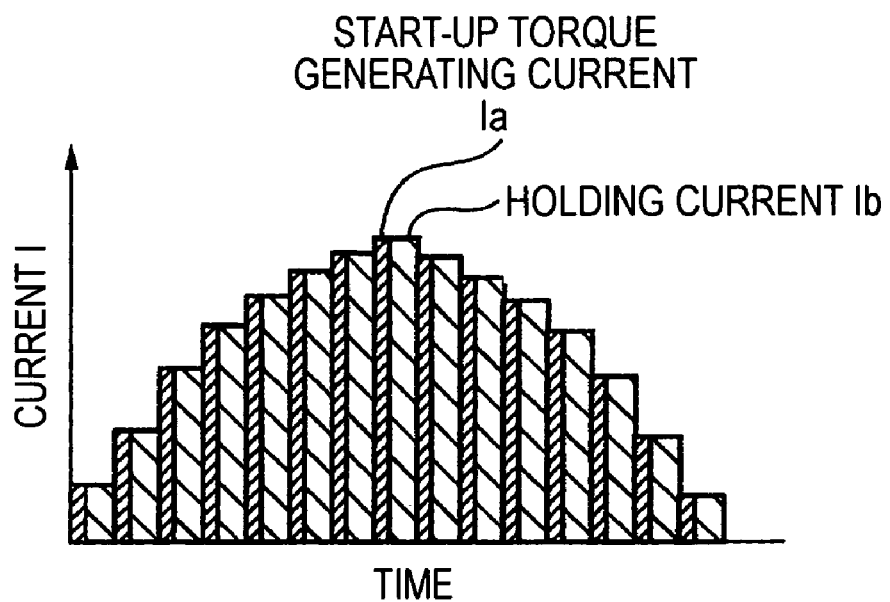
FIG. 5 is a diagram showing a waveform of a driving current outputted from the stepping motor control unit.
Figure 6:
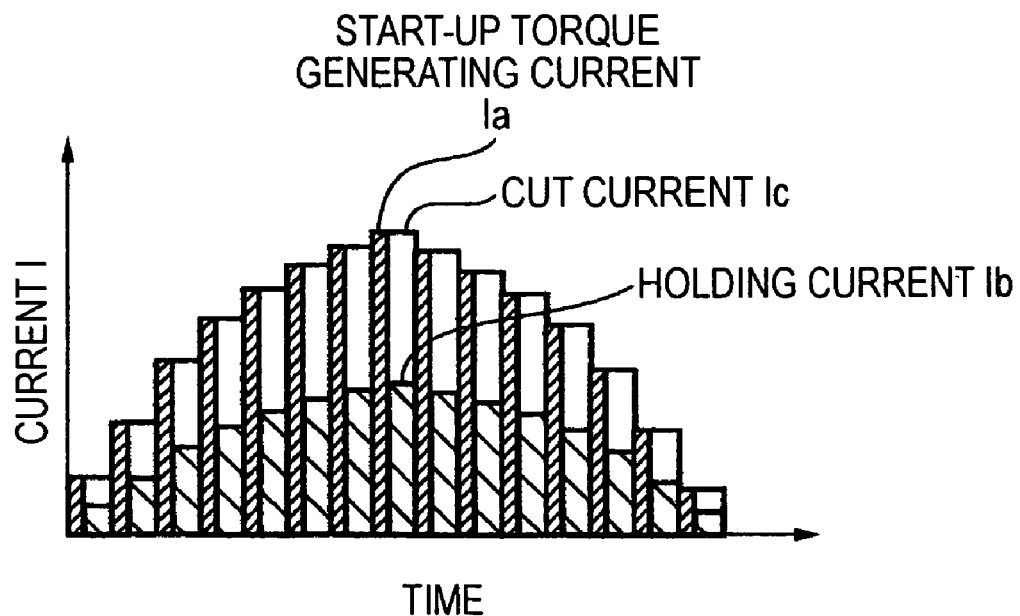
FIG. 6 is a diagram showing a waveform of a driving current outputted from the stepping motor-control unit.

FIGS. 5 and 6 are diagrams showing a waveform of a driving current outputted from the stepping motor control unit 30 of the present embodiment.

As shown in FIG. 5, a start-up torque generating current Ia (hereinafter, simply referred to as a start-up current Ia) which is required to generate a start-up torque is a portion of one square wave. The start-up current is required for rotating the stepping motor 20 at a unit angle. The remaining portion of the square wave is a holding current Ib for holding the rotational angle of the stepping motor 20.

In the present embodiment, the stepping motor control unit 30 maintains the level of the holding current Ib equal to the level of the start-up current Ia when the level of the vibration applied to the optical disk recording and reproducing apparatus 10 is equal to or more than a predetermined threshold value (high vibration) (see FIG. 5). On the other hand, when the level of the vibration is less than the threshold value (low vibration), the stepping motor control unit 30 suppresses the level of the holding current Ib smaller than that of the start-up current Ia (see FIG. 6).

As apparent from FIGS. 5 and 6, while the start-up current Ia maintains a constant level irregardless of the vibration level, the holding current Ib changes according to the vibration level. Specifically, in the case of the low vibration, as indicated by a blank region in FIG. 6, some current Ic is cut since the vibration level is equal to or more than the threshold value. Therefore, in the case of the low vibration shown in FIG. 6, power consumption can be suppressed by that current Ic.

Generally, if the holding current Ib is large, the holding torque becomes large, and thus the stop position of the stepping motor 20 is hardly influenced by disturbance such as vibration. In this case, however, the power consumption increases, and the heating value increases. On the other hand, if the holding current Ib is small, the power consumption is small and also the heating value is small. In this case, however, the holding torque is small, and thus the stop position of the stepping motor 20 is likely to be influenced by the disturbance such as vibration.

In consideration of the above-described problems, when the vibration level is equal to or more than the threshold value, the optical disk recording and reproducing apparatus 10 securely holds the stop position of the stepping motor 20 with the vibration by keeping the holding current Ib at a high level and by making the holding torque large. Further, when the vibration level is less than the threshold value, the optical disk recording and reproducing apparatus 10 suppresses the power consumption and the heating value by lowering the holding current Ib and by making the holding torque small. In the present embodiment, by adopting the above-described configuration, the holding current Ib can be varied according to the vibration level and a trade-off relationship between the holding torque and the power consumption or the heating value can be realized together in a complementary manner.

Moreover, in the description, the size of the holding current Ib is changed according to the predetermined threshold value. However, the present invention is not limited thereto. For example, the size of the holding current Ib may be changed Linearly or curvedly according to the vibration level. Further, plural threshold values may be provided and the size of the holding current Ib may be changed for each threshold value.

Further, when the threshold value is provided, the ratio of the change in the size of the holding current Ib may be set according to the environment of use of the stepping motor 20. For example, at the time of an assumed low vibration, the holding current Ib which can generate the holding torque to an extent such that the stop position of the stepping motor 20 may be not changed by the vibration may flow.

Further, in the case of the high vibration, when a mechanical torque at the time of non-conduction is sufficiently large, the size of the holding current Ib may be smaller than that of the start-up current Ia.

Summarizing the configuration of the present embodiment, as described above, the optical disk recording and reproducing apparatus 10 has the stepping motor driving system 60. Then, the stepping motor driving system 60 has the stepping motor 20 that rotates at the predetermined angle according to the driving current, the vibration detector 40 that detects the vibration to output the vibration signal, and the stepping motor control unit 30 that controls the driving current flowing in the stepping motor 20 to rotates the stepping motor 20 at the predetermined angle (and the driver 35). Then, the driving current includes the start-up current Ia which is required for rotating the stepping motor 20 at the unit angle and the holding current Ib which holds the rotational angle of the stepping motor 20 rotated by the start-up current Ia. Further, the stepping motor control unit 30 changes the level of the holding current Ib according to the vibration signal outputted from the vibration detector 40.

According to the present embodiment, by changing the size of the holding current Ib according to the vibration level, the proper holding current Ib may flow in the stepping motor 20 for each vibration level. Therefore, an unnecessary holding current Ib is decreased and the power consumption is reduced, which makes it possible to suppress the heating value from the stepping motor 20. Further, if necessary, the level of the holding current Ib may be maintained high, and thus the holding torque of the stepping motor 20 becomes high. Accordingly, the operation of the carriage which is controlled by the stepping motor 20 may be not influenced by the disturbance. As a result, even in the case of a vehicle where the vibration is likely to be caused, the optical disk recording and reproducing apparatus which is hardly influenced by the vibration and has a low heating value can be provided.

Specifically, when the level of the vibration signal is equal to or more than the predetermined value, the stepping motor control unit 30 can allow the level of the holding current Ib equal to that of the start-up current Ia. In such a manner, when the vibration is generated with respect to the stepping motor 20, the disturbance can be prevented influencing on the operation of the carriage which is controlled by the stepping motor 20 by increasing the holding current Ib and by making the holding torque of the stepping motor 20 large.

On the other hand, when the level of the vibration signal is less than the predetermined value, the stepping motor control unit 30 can make the holding current Ib smaller than the start-up current Ia. In such a manner, when the vibration is not generated so much with respect to the stepping motor 20, by lowering the holding current Ib and by making the holding torque of the stepping motor 20 small, it is possible to suppress the heating value of the stepping motor 20.

Moreover, in the description, the vehicle optical disk recording and reproducing apparatus is exemplified. However, the present invention is not limited thereto. For example, the stepping motor driving system 60 can be applied to an optical disk recording and reproducing apparatus which is likely to be exposed to the vibration, for example, a portable optical disk recording and reproducing apparatus.

Further, in the description, the optical disk recording and reproducing apparatus is exemplified as the information recording and reproducing apparatus. However, the present invention is not limited thereto. For example, the present invention can be applied to various recording and reproducing apparatuses which record into a recording medium and reproduce the recording medium with the stepping motor.

What is claimed is:

1. A stepping motor driving system comprising:
    a stepping motor that rotates at a predetermined angle according to a driving pulse signal;
    a vibration detector that detects vibration to output a vibration signal; and
    a stepping motor control unit that controls the driving pulse signal, which is applied to the stepping motor, to rotate the stepping motor at the predetermined angle;
    wherein the driving pulse signal includes a start-up current which is required for rotating the stepping motor at a unit angle and a holding current which maintains a rotational angle of the stepping motor rotated by the start-up current; and
    the stepping motor control unit changes the level of the holding current according to the vibration signal which is outputted from the vibration detector.

2. The stepping motor driving system according to claim 1,
    wherein the stepping motor control unit holds the level of the holding current equal to that of the start-up current when the level of the vibration signal is equal to or more than a predetermined value.

3. The stepping motor driving system according to claim 1,
    wherein the stepping motor control unit makes the holding current smaller than the start-up current when the level of the vibration signal is less than a predetermined value.

4. An information recording and reproducing apparatus comprising a stepping motor driving system;
    wherein the stepping motor driving system includes:
        a stepping motor that rotates at a predetermined angle according to a driving pulse signal,
        a vibration detector that detects vibration to output a vibration signal, and
        a stepping motor control unit that controls the driving pulse signal, which is applied to the stepping motor, to rotate the stepping motor at the predetermined angle;
    the driving pulse signal includes a start-up current which is required for rotating the stepping motor at a unit angle and a holding current which maintains a rotational angle of the stepping motor rotated by the start-up current; and
    the stepping motor control unit changes the level of the holding current according to the vibration signal which is outputted from the vibration detector.

5. A stepping motor driving method comprising:
    detecting vibration to generate a vibration signal; and
    controlling a driving pulse signal, which is applied to a stepping motor, to rotate the stepping motor at a predetermined angle;
    wherein the driving pulse signal includes a start-up current which is required for rotating the stepping motor at a unit angle and a holding current which maintains a rotational angle of the stepping motor rotated by the start-up current; and
    the level of the holding current is changed according to the generated vibration signal.

* * * * *